United States Patent Office 3,560,453
Patented Feb. 2, 1971

3,560,453
PRODUCTION OF AN N-DIMETHYL-SUBSTITUTED POLYACYLOXAMIDRAZONE
Albert Schöpf, Hering, Odenwald, and Gerhard Meyer, Obernburg, Germany, assignors to Glanzstoff AG, Wuppertal, Germany
No Drawing. Filed July 7, 1969, Ser. No. 839,666
Claims priority, application Germany, July 10, 1968, 1,770,845
Int. Cl. C08g 20/20, 20/22
U.S. Cl. 260—78         9 Claims

ABSTRACT OF THE DISCLOSURE

Production of a polyacyloxamidrazone bearing a methyl group as a substituent on nitrogen atoms in the polymer chain, the polymer being produced by reaction of N,N'-dimethyl oxalic acid bisamidrazone with a dicarboxylic acid dichloride or dibromide in the presence of an acid acceptor. The resulting polycondensate exhibits valuable properties as a fiber-forming or film-forming product.

---

In copending U.S. application, Ser. No. 716,364, there is disclosed a special process for the production of polyacycloxamidrazones which are linear polycondensates with recurring units of the formula

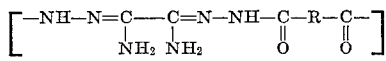

wherein R is a divalent organic radical of 2 up to about 12 carbon atoms, preferably 2 to 6 carbon atoms, in an essentially hydrocarbon structure, e.g. the 1,4-phenyl radical. In order to achieve especially high molecular weight polymers having favorable fiber- or film-forming properties, it was discovesed to be essential to produce the polymer by reacting oxalic acid bisamidrazone with a dicarboxylic acid dichloride or dibromide in a special two phase solvent system in the presence of an acid acceptor while mixing and withdrawing the heat of reaction, the reaction temperature being maintained between about 0° C. and 60° C. The resulting product can be converted into a poly-bis-(1,2,4-triazole) by cyclodehydration at elevated temperatures.

It was previously known that this polycondensation could be carried out in a single phase solvent system, using a single solvent or two or even more solvents which are miscible with each other. In this case, however, the polycondensate has a lower molecular weight which results in less satisfying properties in films or fibers made therefrom. These lower molecular weight polycondensates are also characterized by their greater solubility in conventional solvents, at least until they are converted into the corresponding poly-bis-(1,2,4-triazole). In attempting to use a two phase solvent system of two different solvents which are normally immiscible, i.e. at most only slightly soluble in one another, it was also found to be difficult to achieve satisfactory high molecular weight film-forming or fiber-forming properties.

One object of the present invention is to provide a novel high molecular weight polyacyloxamidrazone which is capable of being produced using all of the previously disclosed solvent systems while still enhancing the desired properties of this polymer. Other objects and advantages of the invention are explained in greater detail hereinafter.

It has now been found, in accordance with the invention that a new polyacyloxamidrazone with valuable properties can be produced by reacting N,N'-dimethyl oxalic acid bisamidrazone of the formula

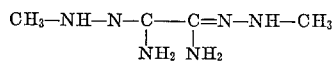

with an organic dicarboxylic halide of the formula

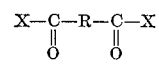

wherein X is chlorine or bromine and R is a divalent hydrocarbon radical of at least 2 up to about 12 and preferably 2 to 6 carbon atoms, with the reaction being carried out in a single or two phase solvent system at a temperature between about 20° C. and 40° C. and in the presence of an acid acceptor. As in previous polycondensations of this type, which are all strongly exothermic reactions, it is desirable to constantly mix the reaction medium while withdrawing the heat of reaction.

The resulting high molecular weight polyacyloxamidrazone consists essentially of recurring units of the formula

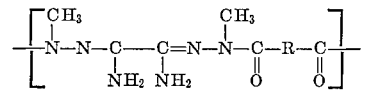

wherein R has the same meaning as above, i.e. as derived from the dicarboxylic acid halide. Especially useful products are achieved where R is the 1,4-phenyl radical.

The N,N'-dimethyl oxalic acid bisamidrazone reactant is in itself a novel compound which can be obtained by the method explained in copending U.S. application, Ser. No. 838,430, filed July 2, 1969, the disclosure of which is incorporated herein by reference as fully as if set forth in its entirety. In essence, this reactant is prepared by reacting methyl hydrazine with the methyl or ethyl ester of oxaldiimidic acid at a temperature of preferably about room temperature up to 40° C. in an inert organic solvent, preferably under an inert nitrogen atmosphere and substantially anhydrous conditions. The reactants are employed in stoichiometric amounts in accordance with the reaction equation:

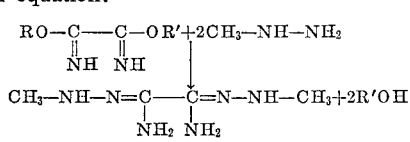

wherein R' represents methyl or preferably ethyl. Actually, N,N'-dimethyl oxalic acid bisamidrazone exists in the form of three tautomeric isomers, only one of the tautomeric formulae being used herein for simplicity. It should also be understood that the present invention is not directed to this novel reactant except as a means of achieving new and valuable polyacryloxamidrazones.

Suitable dicarboxylic acid dihalides for the production of the new polyacyloxamidrazones generally include the dibromides and especially the dichlorides of the following acids: adipic acid, sebacic acid, succinic acid, fumaric acid, glutaric acid, 1,4-cylohexane diarboxylic acid, homoterephthalic acid, isophthalic acid, naphthalene dicarboxylic acid, p,p'-diphenylether dicarboxylic acid and terephthalic acid. Especially valuable products are obtained by reacting the N,N'-dimethyl oxalic acid bisamidrazone with terephthalic acid dichloride in approximately equimolar proportions. Any substantial excess of either of the reactants is generally avoided simply for economical reasons.

The use of an acid acceptor is necessary to achieve a better reaction rate by taking up the hydrogen chloride or bromide split off during polycondensation. Conventional acid acceptors can be used, including alkali metal carbonates or bicarbonates, especially those of sodium or potassium such as soda (sodium carbonate) or sodium bicarbonate, and also typical organic bases such as pyridine or triethylamine. It is preferable to use an acid acceptor which is soluble in one or more of the solvents providing the reaction medium. Where water is employed as one solvent of a two phase system, it is often advantageous to use, as the acid acceptor, a basic-reacting inorganic salt which is soluble in water. In principle, however, any organic or inorganic basic-reacting compound may be used. As is customary, the acid acceptor is preferably added in a stoichiometric amount, i.e. an amount sufficient to bind the hydrogen halide which is liberated during the polycondensation.

A particular advantage of the present invention resides in the fact that the polycondensation reaction can be carried out in either a single phase or two phase solvent system, i.e. in the homogeneous phase of one or more organic solvents as well as in a two phase mixture of two different solvents which are normally immiscible or which can be made partly or wholly immiscible by the addition of a conventional salting out agent. The individual phases of the two phase solvent system may of course be made up of a single solvent or a mixture of solvents. In general, a skilled chemist can readily select any number of useful solvents for use in either a single or two phase system, e.g. by a routine determination of solubility characteristics with the monomeric reactants.

When working in a single phase reaction medium, the solvent or mixture of miscible solvents forming the homogeneous phase should be substantially inert to both monomeric reactants as well as being capable of dissolving each of these reactants. It is therefore preferable to select a suitable organic solvent for this single phase such as hexamethylphosphoric acid triamide, dimethyl formamide, N-methylpyrrolidone or butyrolactone. Particularly good results are achieved with a single phase solvent system consisting essentially of hexamethylphosphoric acid triamide which can also serve as an acid acceptor.

Two phase solvent systems are also readily selected from common solvents which are combined so that one solvent is normally immiscible in the other or can be rendered partly or substantially immiscible by the addition of a salting out agent. It is generally desirable to select one inert organic solvent for the dicarboxylic acid dihalide and a second distinct solvent for the N,N-dimethyl oxalic acid bisamidrazone, preferably water.

Suitable solvents for the dicarboxylic acid dihalides include the following: methyl acetate, ethyl acetate, hexamethylphosphoric acid triamide, tetrahydrofuran, dioxane, hexane, heptane, cyclohexane, decalin, glycol carbonate, 1,2-dimethylglycol carbonate, oxalic acid diethyl ester, acetonitrile, malonic acid diethyl ester, chloroform and carbon tetrachloride. On the other hand, especially suitable solvents for the N,N'-dimethyl oxalic acid bisamidrazone include the following: water, ethylene glycol, hexamethylphosphoric acid triamide, dimethyl formamide, N-methylpyrrolidone and butyrolactone. These solvents are set forth as typical examples, and it will be understood that they may be selected or combined so as to fulfill the condition of forming two phases which are immiscible with each other, if necessary, with the addition of a salting out agent. Of course, the solvents may also be selected to form a single homogeneous phase.

Thus, for the purpose of forming a two phase solvent system, the following combinations are suitable: water/carbon tetrachloride; water/ethyl acetate; aqueous solution of sodium carbonate/tetrahydrofuran; carbon tetrachloride/ethylene glycol; decalin/dimethyl formamide; heptane/dimethyl formamide; and cyclohexane/dimethyl formamide.

As the salting out agent, where required to obtain a two phase solvent system of miscible solvents, it is possible to employ any number of water-soluble inorganic salts commonly used for this purpose. It will be understood, of course, that one may use neutral or basic-reacting salts which are either inert to or only favorably affect the polycondensation reaction. Thus, neutral salts will not enter into the reaction itself but merely serve to maintain the two distinct phases, e.g. between water and organic solvent. On the other hand, an acid acceptor such as sodium carbonate can simultaneously serve as a salting out agent, i.e. a water-soluble, basic-reacting inorganic salt serves both functions. Typical salting out agents include the following: sodium sulfate, sodium carbonate, sodium bicarbonate, sodium chloride, potassium sulfate, potassium carbonate and potassium chloride.

For working in a single or homogeneous phase, the polycondensation of the dimethyl-substituted oxalic acid bisamidrazone takes place especially well in hexamethylphosphoric acid triamide as the solvent. Particularly good results are also achieved by using a two phase solvent system of a water/tetrahydrofuran mixture wherein the miscibility of the two solvents has been substantially reduced by the addition of sodium sulfate as the salting out agent.

The temperature range of 20° C. to 40° C. for carrying out the polycondensation reaction of this invention is critical in that at temperatures below 20° C. require an unusually long reaction time while above 40° C. a very pronounced cyclodehydration tends to occur.

It is desirable to continue the polycondensation reaction until the N-dimethyl-substituted polyacyloxamidrazone has achieved a reduced viscosity of at least 0.4, preferably about 0.7 up to 1.2 or even higher, this viscosity ($\eta_{red}$) being measured as a solution of 1 gram of polymer in 100 ml. of 98% $H_2SO_4$ at 20° C. The reduced viscosity is a measure of the molecular weight of the polymer, and a high molecular weight is especially desirable in achieving desirable film-forming or fiber-forming properties. The addition of a methyl substituent to the polymer chain at regular repeated intervals also appears to enhance these desirable properties.

As compared to the unsubstituted polymers, the N-dimethyl-substituted polyacyloxamidrazones of the present invention have a much stronger tendency to split off water and cyclize during the polycondensation so that at temperatures over 80° C. there is a substantially complete conversion into the corresponding poly - bis - (1,2,4-triazoles). Between 40° C. and 80° C., partly cyclized products are formed.

As with the previous polyacyloxamidrazones, the novel polymers of the present invention are generally useful as plastic materials capable of being shaped into various products, especially films or fibers. Conversion of the N-dimethyl-substituted polyacyloxamidrazone into its corresponding poly-bis-(1,2,4-triazole) is accomplished much more easily by simply heating above 80° C., preferably at about 280–320° C. to reduce the reaction period and at reduced pressure, i.e. in a vacuum. The thermal resistance of the resulting cyclized product is higher than the corresponding non-substituted products.

The invention is further illustrated in detail by the following examples:

EXAMPLE 1

8.12 grams of terephthalic acid dichloride (terephthaloyl chloride) are dissolved in 40 ml. of hexamethylphosphoric acid triamide and then quickly introduced with stirring into a solution of 5.77 grams of N,N'-dimethyl oxalic acid bisamidrazone in 80 ml. of hexamethylphosphoric acid triamide, wherein the hexamethylphosphoric acid triamide simultaneously acts as an acid acceptor.

The temperature increases rapidly from 35° C. to 40° C. due to the liberated heat of the reaction and is therefore reduced to and maintained at 25° C. by indirect cooling with ice. After a reaction period of 65 hours, the polymer is precipitated with ethanol and washed several times. The reduced viscosity ($\eta_{red}$), measured as a 1% solution of the polymer in 98% sulfuric acid at 20° C., amounts to 0.99. The infrared spectrum shows a strong amide band at 1630 cm.$^{-1}$.

EXAMPLE 2

22.5 grams of sodium sulfate and 12.7 grams of sodium carbonate are dissolved in 375 ml. of water. Then, a solution of 10.80 grams of N,N'-dimethyl oxalic acid bisamidrazone in another 375 ml. of water is added thereto. This mixture is combined while intensively stirring with a solution of 15.37 grams of terephthalic acid dichloride in 750 ml. of tetrahydrofuran which is free of water and peroxides, and the mixture then further intensively stirred with cooling for 15 minutes. The polymer precipitate which is formed is then centrifuged off, washed several times with water and dried. The reduced viscosity of the polymer ($\eta_{rel}$), measured as in the preceding example, amounts to 0.76.

When the N-dimethyl-substituted polymer products of the foregoing examples are cyclodehydrated, i.e. cyclized with the elimination of water, they yield the corresponding poly-bis-(1,2,4-triazole) having a thermal resistance which is 20° C. higher than the corresponding unsubstituted polymer.

The invention is hereby claimed as follows:

1. A high molecular weight fiber-forming polyacyloxamidrazone consisting essentially of recurring units of the formula

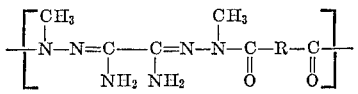

wherein R represents a divalent hydrocarbon radical of at least 2 up to about 12 carbon atoms.

2. A polyacyloxamidrazone as claimed in claim 1 wherein R is a divalent hydrocarbon radical of 2 to 6 carbon atoms.

3. A polyacyloxamidrazone as claimed in claim 1 wherein R represents the 1,4-phenyl radical.

4. A process for the production of a fiber-forming N-methyl-substituted polyacyloxamidrazone which comprises reacting N,N'-dimethyl oxalic acid bisamidrazone of the formula:

$$CH_3-NH-N=C-C=N-NH-CH_3$$
$$\quad\quad\quad\quad\quad | \quad\quad |$$
$$\quad\quad\quad\quad NH_2 \quad NH_2$$

with an organic dicarboxylic acid halide of the formula

wherein X is chlorine or bromine and R is a divalent hydrocarbon radical of at least 2 up to about 12 carbon atoms, said reaction being carried out in a single or two phase solvent system at a temperature between about 20° C. and 40° C. and in the presence of an acid acceptor.

5. A process as claimed in claim 4 wherein said solvent system is a single phase organic solvent in which both reactants are soluble.

6. A process as claimed in claim 4 wherein said solvent system is a two phase mixture of two different solvents.

7. A process as claimed in claim 4 wherein the organic dicarboxylic acid dihalide is terephthalic acid dichloride.

8. A process as claimed in claim 4 which is carried out in a single phase solvent system consisting essentially of hexamethylphosphoric acid triamide.

9. A process as claimed in claim 4 which is carried out in a two phase solvent system consisting essentially of a mixture of water and tetrahydrofuran containing a salting out agent.

References Cited

UNITED STATES PATENTS

| 3,130,182 | 4/1964 | Frazer | 260—78 |
| 3,376,267 | 4/1968 | Pruckmayr | 260—78 |
| 3,389,122 | 6/1968 | Culbertson | 260—78X |

OTHER REFERENCES

Saga et al.: Journal of Polymer Science, pt. B, vol. 4, 1966, pp. 869–73.

Saga et. al.: Chem. Abstracts, vol. 67, 1967, 117411j.

WILLIAM H. SHORT, Primary Examiner

H. SCHAIN, Assistant Examiner

PO-1050 (5/69)

UNITED STATES PATENT OFFICE
CERTIFICATE OF CORRECTION

Patent No. 3,560,453      Dated February 2, 1971

Inventor(s) Albert Schöpf

It is certified that error appears in the above-identified patent and that said Letters Patent are hereby corrected as shown below:

Column 1, line 40, "discovesed" should read -- discovered --

Column 2, line 3, that portion of the formula reading "$CH_3-NH-N-C$" should read -- $CH_3-NH-N=C$ --; line 22, that portion of the formula reading "$N-C$ " should read -- $N=C$ --; line
                                     $NH_2$                  $NH_2$ that portion of the formula reading "RO" should read -- R'O
line 58, "1,4-cylohexane diarboxylic" should read
-- 1,4-cyclohexane dicarboxylic --.

Signed and sealed this 29th day of June 1971.

(SEAL)
Attest:

EDWARD M. FLETCHER, JR.           WILLIAM E. SCHUYLER,
Attesting Officer                  Commissioner of Paten